United States Patent
Armstrong et al.

(10) Patent No.: US 8,230,434 B2
(45) Date of Patent: Jul. 24, 2012

(54) ENTITLEMENT MANAGEMENT SYSTEM, METHOD AND PROGRAM PRODUCT FOR RESOURCE ALLOCATION AMONG MICRO-PARTITIONS

(75) Inventors: William J. Armstrong, Rochester, MN (US); Christopher G. Hales, Hints (GB); Naresh Nayar, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1156 days.

(21) Appl. No.: 11/859,967

(22) Filed: Sep. 24, 2007

(65) Prior Publication Data
US 2008/0077927 A1    Mar. 27, 2008

(30) Foreign Application Priority Data
Sep. 26, 2006 (GB) .................................. 0618894.0

(51) Int. Cl.
G06F 9/50 (2006.01)
G06F 9/46 (2006.01)

(52) U.S. Cl. .......................................... 718/104; 713/1
(58) Field of Classification Search .................... 718/104
See application file for complete search history.

(56) References Cited

U.S. PATENT DOCUMENTS

| | | | | |
|---|---|---|---|---|
| 5,473,773 A * | 12/1995 | Aman et al. | ................. | 718/104 |
| 5,530,860 A * | 6/1996 | Matsuura | ..................... | 718/105 |
| 6,260,068 B1 * | 7/2001 | Zalewski et al. | ............. | 709/226 |
| 6,851,030 B2 * | 2/2005 | Tremaine | ..................... | 711/160 |
| 7,007,276 B1 | 2/2006 | Kubala et al. | | |
| 2002/0156824 A1 * | 10/2002 | Armstrong et al. | ........... | 709/104 |
| 2003/0037092 A1 * | 2/2003 | McCarthy et al. | ............ | 709/104 |
| 2003/0055864 A1 * | 3/2003 | Armstrong et al. | ........... | 709/107 |
| 2004/0168170 A1 * | 8/2004 | Miller | ........................... | 718/104 |
| 2004/0199632 A1 * | 10/2004 | Romero et al. | ................ | 709/226 |

(Continued)

FOREIGN PATENT DOCUMENTS
WO     02086698 A1    10/2002

OTHER PUBLICATIONS

Nic et al., Partitioning Implementations for IBM @server p5 Servers, Feb. 2005, IBM, Third Edition, pp. 71-74.*

(Continued)

*Primary Examiner* — Jennifer To
*Assistant Examiner* — Abu Z Ghaffari
(74) *Attorney, Agent, or Firm* — Hoffman Warnick LLC; Andrea Bauer (57) ABSTRACT

An entitlement management system for distributing spare CPU processor resources to a plurality of deployment groups operating in a data processing system, the system comprising: a deployment group entitlement component comprising: an allocation component for allocating a plurality of micro-partitions to a deployment group; a determining component for identifying spare CPU processor cycles from a donor micro-partition and distributing the identified spare CPU processor cycles to a requester micro-partition in the deployment group; the determining component further comprises identifying when there are no further spare CPU processor cycles to be donated to any of the micro-partitions in the deployment group and communicating a request to a management entitlement component; and a management entitlement component receiving requests from at least two deployment group entitlement components and identifying if one of the deployment groups has spare CPU processor cycles to donate to a further deployment group and on a positive determination donating the spare CPU cycles to the further deployment group.

18 Claims, 9 Drawing Sheets

U.S. PATENT DOCUMENTS

| | | | |
|---|---|---|---|
| 2004/0226015 A1* | 11/2004 | Leonard et al. | 718/100 |
| 2005/0055694 A1* | 3/2005 | Lee | 718/100 |
| 2006/0123217 A1* | 6/2006 | Burdick et al. | 711/173 |
| 2006/0206891 A1* | 9/2006 | Armstrong et al. | 718/1 |

OTHER PUBLICATIONS

Irving et al., Partitioning Implementations for IBM @server p5 Servers, Feb. 2005, IBM, pp. 1-342.*

Vagmo et al., "Advanced Power Virtualization on IBM System p5," IBM Redbook SG24-7940-01, Dec. 2005, pp. I-IV, 19-22, 45-58, 64-67, 72-74, 114, 115, 331-340, 388-396, XP002460344. Retrieved from the Internet: URL:http:// www.armin-warda.de/sg247940 (the whole document).

"PCT Notification of Transmittal of the International Search Report and the Written Opinion of the International Searching Authority, or the Declaration," from the International Searching Authority (Jul. 12, 2007).

Kielhofer, Patrick, "EPO Examination Report", Dated Aug. 27, 2009, 6 pages.

* cited by examiner

Prior Art

300

Scope of CPU entitlement system

| uPS | Status | Ent | HCk | RqCk | EMA Donor |
|---|---|---|---|---|---|
| 0 | c | 1.05 | 3725 | 0 | Donor |
| 1 | c | 0.55 | 3245 | 0 | Donor |
| 2 | u | 0.57 | 0 | 6210 | Requester |
| 3 | u | 0.38 | 4582 | 3224 | Donor |
| 4 | u | 0.43 | 0 | 0 | Requester |
| 5 | c | 0.65 | 254 | 0 | Donor |
| 6 | c | 1.25 | 3725 | 0 | Donor |
| 7 | c | 0.15 | 3245 | 0 | Donor |
| 8 | u | 0.25 | 0 | 6210 | Requester |
| Totals | | 5.28 | 18776 | 15644 | 3132 |

| ID | Status | CPU | c/u status | No. of uPS | Addr 1st | Addr last |
|---|---|---|---|---|---|---|
| 0 | Donor | 2.10 | C | 3 | ffdfa0 | ffffb0 |
| 1 | Donor | 3.50 | U | 3 | ffcfa0 | ffffc0 |
| 2 | Req. | 1.76 | C | 3 | fffcc0 | ffffd0 |

ENTITLEMENT MANAGEMENT SYSTEM, METHOD AND PROGRAM PRODUCT FOR RESOURCE ALLOCATION AMONG MICRO-PARTITIONS

BACKGROUND OF THE INVENTION

1. Field of the Invention

The invention relates to the field of data processing systems. In particular the invention relates to a method and system for an entitlement management system for managing the entitlement, harvesting, and distribution of CPU processor cycles.

2. Related Art

The speed and efficiency of many computing applications depends upon the availability of processing resources. To this end, computing architectures such as the 'virtual machine' design, developed by International Business Machines Corporation, share common processing resources among multiple processes. Such an architecture may conventionally rely upon a single computing machine having one or more physical controllers, or central processing units (CPUs). The CPUs may execute software configured to simulate multiple virtual processors.

Such multiprocessor environments support the conceptual practice of logical 'partitioning'. Partitioning provides a programmed architecture suited for assignment and sharing of assets. A partition may logically comprise a portion of a machine's CPUs, memory, and other resources, as assigned by an administrator. As such, an administrator may allocate portions of resources to more than one partition. Each partition may additionally host an operating system, in addition to multiple virtual processors. In this manner, each partition operates largely as if it is a separate computer.

Each virtual processor may access many of the physical resources of the underlying physical machine. Exemplary resources may include memory assets and hardware registers, in addition to the CPUs. Virtual processors may additionally share a priority scheme or schedule that partially dictates allocation of processing cycles between virtual processors. An underlying program called a 'hypervisor' or partition manager, may use this scheme to assign and dispatch CPUs to each virtual processor. For instance, the hypervisor may intercept requests for resources from operating systems to globally share and allocate them.

In this manner, virtual processors act as logical threads of execution for a host partition. As such, the virtual processors can separately execute instructions, while sharing resources. By duplicating the utilization of physical assets, a partitioned environment can promote better performance and efficiency. The programmable flexibility of partitions may further allow them to respond to changes in load dynamically without rebooting. For example, each of two partitions containing ten virtual processors may take over all the CPUs of a shared physical system without requiring a re-boot or operator intervention.

To promote proportionate resource allocation, an administrator may place constraints on the number of resources accessible by a virtual processor. For instance, the hypervisor may be constrained by a rule never to dispatch more than fifty percent of available CPU resources to a certain processor. Similarly, the hypervisor may ensure that a virtual processor's use of a CPU does not exceed a specified duration. In this manner, the virtual processor may be allocated a 'time slice' of a CPU, at the expiration of which, the hypervisor may pre-empt the virtual processor's use of the CPU. Through similar programming, a complex application can theoretically be distributed among many processors instead of waiting on a single processor.

Figure 1:
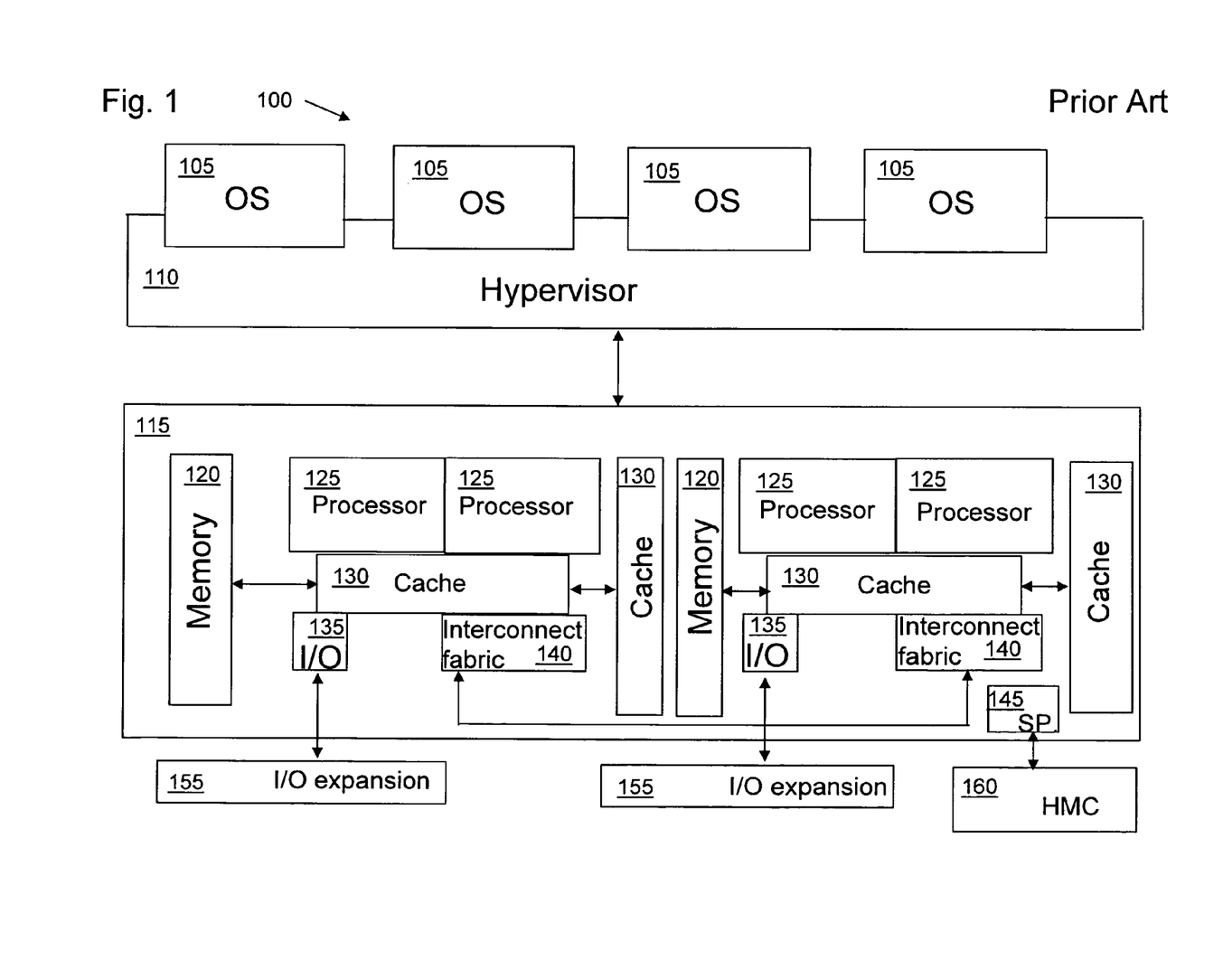
FIG. 1 is a data processing system in which an embodiment of the present invention can be implemented.

To illustrate further, referring now to FIG. 1, there is shown a simplified diagram of a data processing system 100 in which a hypervisor 110 operates. The hypervisor layer 110 is responsible for validating operating system 105 requests to use shared platform resources 115, such as a physical processors 125, memory 120, cache 130, input/output slots 135, and expansion boards 155 etc., thus ensuring the integrity and isolation of each partitioned system. Each of these components is connected via a series of interconnection fabrics 140.

Operational management for the platform is performed using a hardware management console (HMC) 160. The HMC 160 interfaces with a processor 145 and is a set of firmware tools, optionally running on replicated hardware that manages platform resources via messages to the hypervisor 110 and the operating system 105 partitions. The HMC 110 creates the initial configuration definitions, control boot, and termination of the various partitions, and provides virtual console support. A partition, which can either be a dedicated or a shared processor partition, views its physical processors 125 as virtual processors. The virtual processor of a dedicated processor partition has a virtual processor allocated to it, while the virtual processor of a shared processor partition shares the physical processors of the shared processor pool with virtual processors of other shared processor partitions.

A problem occurs when there is a need to prioritize the entitlement and management of CPU processor cycles for particular applications, types of business functions or tasks which require access to more CPU resources than other types of tasks. For example, a transaction processing system for a bank can be considered a high priority application because it needs high availability access to processing resources for most of the day in order to meet customer demand. Now compare this to a database query system for a back-office application which is used only for a few hours a day and only requires a small amount of CPU processing resource to satisfy its processing needs. Thus, there is a need to allocate CPU resources to particular applications, functions or tasks etc on a weighting basis, for example, on 'my need is greater than yours basis'. Another problem which arises is how to manage the entitlement issues and harvesting of spare processing cycles such that one group is not starved of CPU processing resources and another group has an abundance of spare CPU processing cycles, after its own entitlement request has been fulfilled, such that the spare CPU processing resources do not go to waste.

SUMMARY OF THE INVENTION

According to a first aspect, the present invention provides an entitlement management system for distributing spare CPU processor resources to a plurality of deployment groups operating in a data processing system, the system comprising: a deployment group entitlement component comprising: an allocation component for allocating a plurality of micro-partitions to a deployment group; a determining component for identifying spare CPU processor cycles from a donor micro-partition and distributing the identified spare CPU processor cycles to a requester micro-partition in the deployment group; the determining component further identifying when there are no further spare CPU processor cycles to be donated to any of the micro-partitions in the deployment group and communicating a request to a management entitlement component; and a management entitlement component receiving requests from at least two deployment group entitlement components and identifying if one of the deployment groups has spare CPU processor cycles to donate to a further deployment group and, on a positive determination, donating the spare CPU cycles to the further deployment group.

Advantageously, the present invention allows for the allocation of deployment groups to a task, a function or an application. Each deployment group has a deployment group entitlement component which resolves entitlement issues, allocation and distribution of spare CPU processor cycles to other micro-partition in its group. If the deployment group entitlement component identifies that there are spare processor cycles within a group for a given dispatch window, an entitlement management component determines by a deployment group's weight allocation which deployment groups should receive the spare processor cycles.

The present invention also provides an entitlement management wherein the management entitlement component further comprises an analysis component for determining an allocation weighting of a deployment group.

The present invention also provides an entitlement management system wherein the analysis component further determines a deployment group having the highest allocation weighting in order to allocate a proportion of identified spare CPU processor cycles to the deployment group having the highest weighting allocation.

The present invention also provides an entitlement management system further comprising an analysis component for determining whether a deployment group is a capped deployment group or an uncapped deployment group.

The present invention also provides an entitlement management system further comprising an analysis component for determining if a deployment group is a donator of CPU processor cycles or a requester of spare CPU processor cycles.

The present invention also provides an entitlement management system wherein the analysis component determines if a deployment group requesting spare processor cycles is an uncapped deployment group and therefore able to receive spare processor cycles.

The present invention also provides an entitlement management system wherein the analysis component further comprises determining if the requesting deployment group is a capped deployment group, and on a positive determination rejecting the requesting deployment group's request.

The present invention also provides an entitlement management system wherein a deployment group is associated with an application level processing function.

Viewed form a second aspect, the present invention provides an entitlement management method for distributing spare CPU processor resources to a plurality of deployment groups operating in a data processing system, the method comprising: allocating a plurality of micro-partitions to a deployment group; identifying spare CPU processor cycles from a donor micro-partition and distributing the identified spare CPU processor cycles to a requester micro-partition in the deployment group; identifying when there are no further spare CPU processor cycles to be donated to any of the micro-partitions in the deployment group; and further identifying if one of the deployment groups has spare CPU processor cycles to donate to a further deployment group and on a positive determination donating the spare CPU cycles to the further deployment group.

Viewed from a third aspect, the present invention provides a method for deploying an application for distributing spare CPU processor resources to a plurality of deployment groups operating in a data processing system, comprising: providing a computer infrastructure being operable to: allocate a plurality of micro-partitions to a deployment group; identify spare CPU processor cycles from a donor micro-partition and distributing the identified spare CPU processor cycles to a requester micro-partition in the deployment group; identify when there are no further spare CPU processor cycles to be donated to any of the micro-partitions in the deployment group; and identify if one of the deployment groups has spare CPU processor cycles to donate to a further deployment group and on a positive determination donating the spare CPU cycles to the further deployment group.

Viewed from a fourth aspect, the present invention provides a program product stored on a computer readable medium, which when executed, distributes spare CPU processor resources to a plurality of deployment groups operating in a data processing system, the computer readable medium comprising program code for: allocating a plurality of micro-partitions to a deployment group; identifying spare CPU processor cycles from a donor micro-partition and distributing the identified spare CPU processor cycles to a requester micro-partition in the deployment group; identifying when there are no further spare CPU processor cycles to be donated to any of the micro-partitions in the deployment group; and identifying if one of the deployment groups has spare CPU processor cycles to donate to a further deployment group and on a positive determination donating the spare CPU cycles to the further deployment group.

Viewed from a fifth aspect, the present invention provides a data processing system for distributing spare CPU processor cycles from donor deployment groups to requester deployment groups, the data processing system comprising: a central processing unit, a memory device, and a storage device adapted for carrying out the invention as described above.

BRIEF DESCRIPTION OF THE DRAWINGS

Embodiments of the invention are described below in detail, by way of example only, with reference to the accompanying drawings.

DETAILED DESCRIPTION OF THE INVENTION

Figure 2:
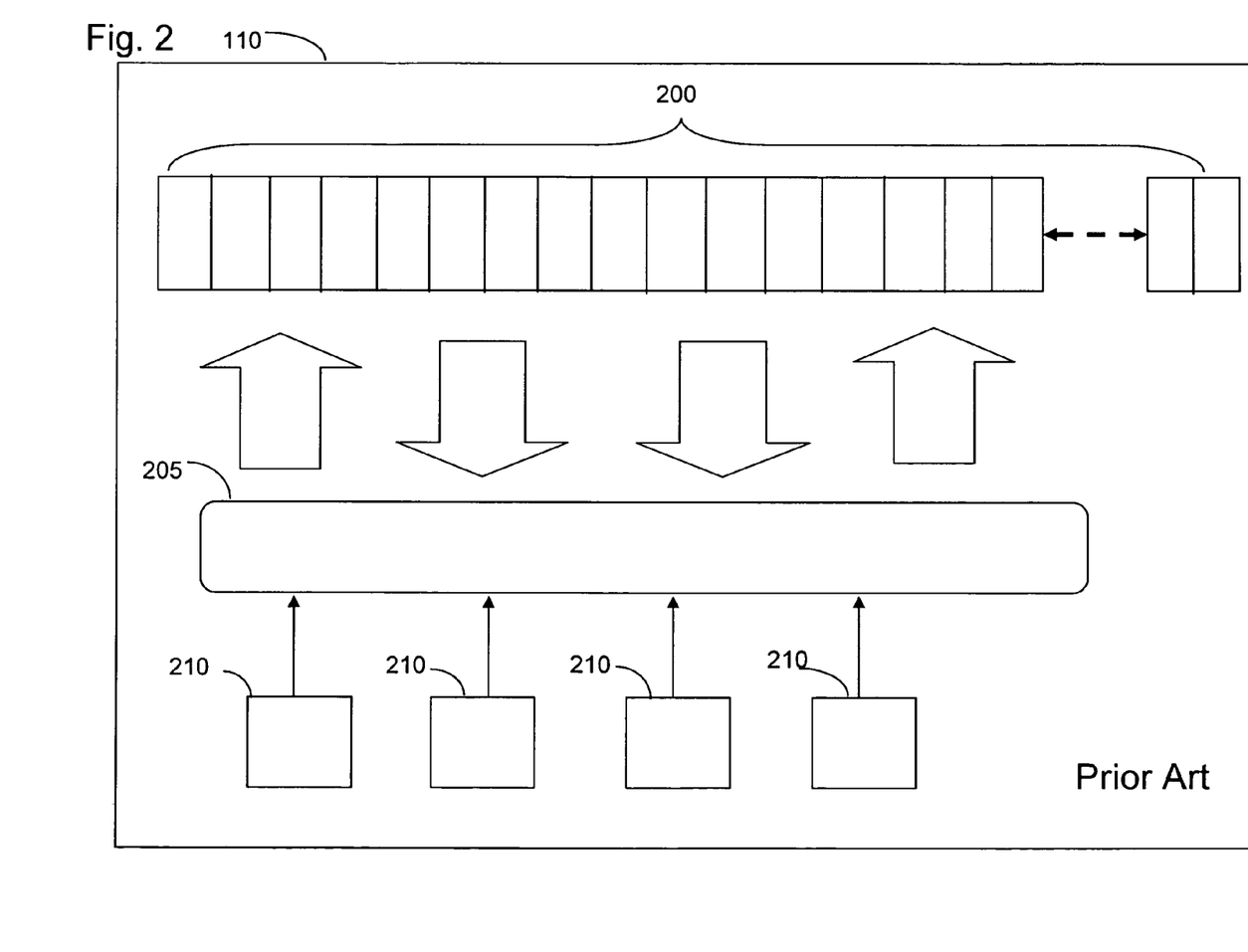
FIG. 2 shows an implementation of a hypervisor application as is known in the art.

Referring to FIG. 2, a prior art CPU entitlement system 205 is shown. The CPU entitlement system 205 resides in the firmware layer on the data processing system 100. The firmware layer is operable for interfacing with an operating system 210 such as AIX, LINUX i5/OS, or an IBM pSeries server, for example. The CPU entitlement system 205 may be part of the hypervisor application 110 or may be a standalone application configurable for communicating with the hypervisor application 110.

The CPU entitlement system 205 is responsible for the allocation of physical processor resources to a shared processor partition 200 operable on a data processing system 100. The physical processor 125 allocation for a virtual processor depends on the entitled capacity and the number of virtual processors that are available for the partition 200. For example, in FIG. 2, the CPU entitlement system 205 allocates processor cycles to micro-partitions 200 within a dispatch window of, for example, 10 milliseconds. All of these micro-partitions 200 (a micro-partition is equivalent to a shared partition) are subject to the harvesting of unused processor cycles. A system administrator specifies whether the shared processor partition is capped or uncapped. A capped partition cannot receive more cycles that its entitled capacity. For example, a particular partition 200 may only be able to receive one thousand processor cycles and thus would be unable to receive any further processor cycles which would take its total entitlement above that cap. Alternatively, an uncapped partition can receive processor cycles beyond its entitled capacity if excess processor cycles are available in the shared processor pool. These spare processor cycles can then be shared amongst other partitions 200 whose need is the greatest.

The CPU entitlement system 205 allows a system administrator to configure a partition's uncapped weight parameter, which may represent a priority share of unused processing capacity relative to the uncapped weight parameters of other uncapped partitions sharing the same processor pool. When there is contention for the excess cycles, this parameter is used by the hypervisor 110 to allocate the excess cycles in the shared processor pool, thus allowing the overall system 100 utilization to be more efficient.

Figure 3:
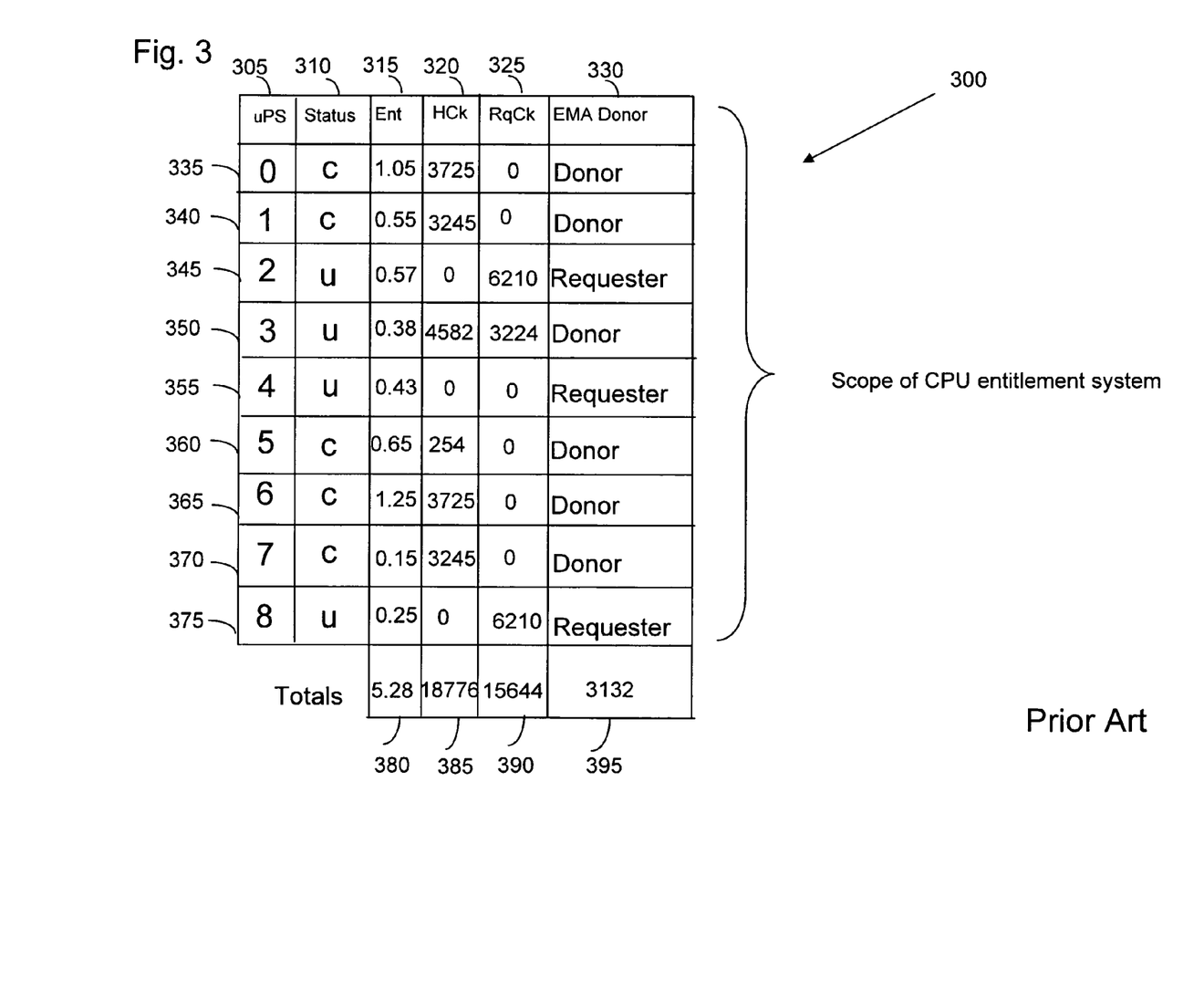
FIG. 3 is a table showing a plurality of micro-partitions as is known in the art.

FIG. 3, shows a table, of an example of, a number of micro-partitions 335, 340, 345, 350, 355, 360, 365, 370, and 375 and the operating characteristics which have their entitlement managed by the CPU entitlement system 205 of FIG. 2. Typically each micro-partition is either designated as a donor 335, 340, 350, 360, 365, 370 of unused processing cycles or a requester 345, 355, 375 of spare processing cycles. The designation of donors 340, 350, 360, 365, 370 may be dynamically changed depending on the operating environment. For example, in the table each micro-partition 335, 340, 345, 350, 355, 360, 365, 370, and 375 is given a unique identifier 305 starting at the number zero and in this example ending at the number eight. Although in practice in for example, some server implementations it is possible to have up to two hundred and fifty four micro-partitions, i.e., starting at number 0 and ending at number two hundred and fifty three. However, in the future, it may be possible to have far more micro-partitions in a server implementation than are available at the moment.

Each micro-partition 335, 340, 345, 350, 355, 360, 365, 370, and 375 as previously explained, is categorized as uncapped or capped. For example, micro-partition number zero 335 is capped which means that micro-partition number zero can only receive processor cycles up to or equal to its designated processor entitlement of 0.35. Alternatively, micro-partition number two 345 is uncapped and therefore may receive more processor cycles than its 0.17 entitlement.

As explained, each micro-partition is given an entitlement allocation 315 representing a portion of the physical processor cycles that it is allowed to consume. For example, micro-partition number three is given an entitlement of 0.38, micro-partition number four is given an entitlement of 0.43, and micro-partition number five is given an entitlement of 0.22. The sum of each of the entitlement allocations is less than or equal to the number of CPU's that are available in the pool of processors.

Towards to bottom of the table 300 there is total field displaying the sum of the CPU entitlements 380, the sum of the harvested processor cycles 385, and the sum of the requested cycles 390 within a dispatch window. A further calculation is performed to determine the difference between the total of the harvested processor cycles and the sum of the requested processor cycles 395.

The table 300 is updated a number of times throughout a predetermined time period within a dispatch period to reflect the changes in the number of harvested processor cycles. This is because some micro-partitions encounter long wait or context switch events.

Figure 4:
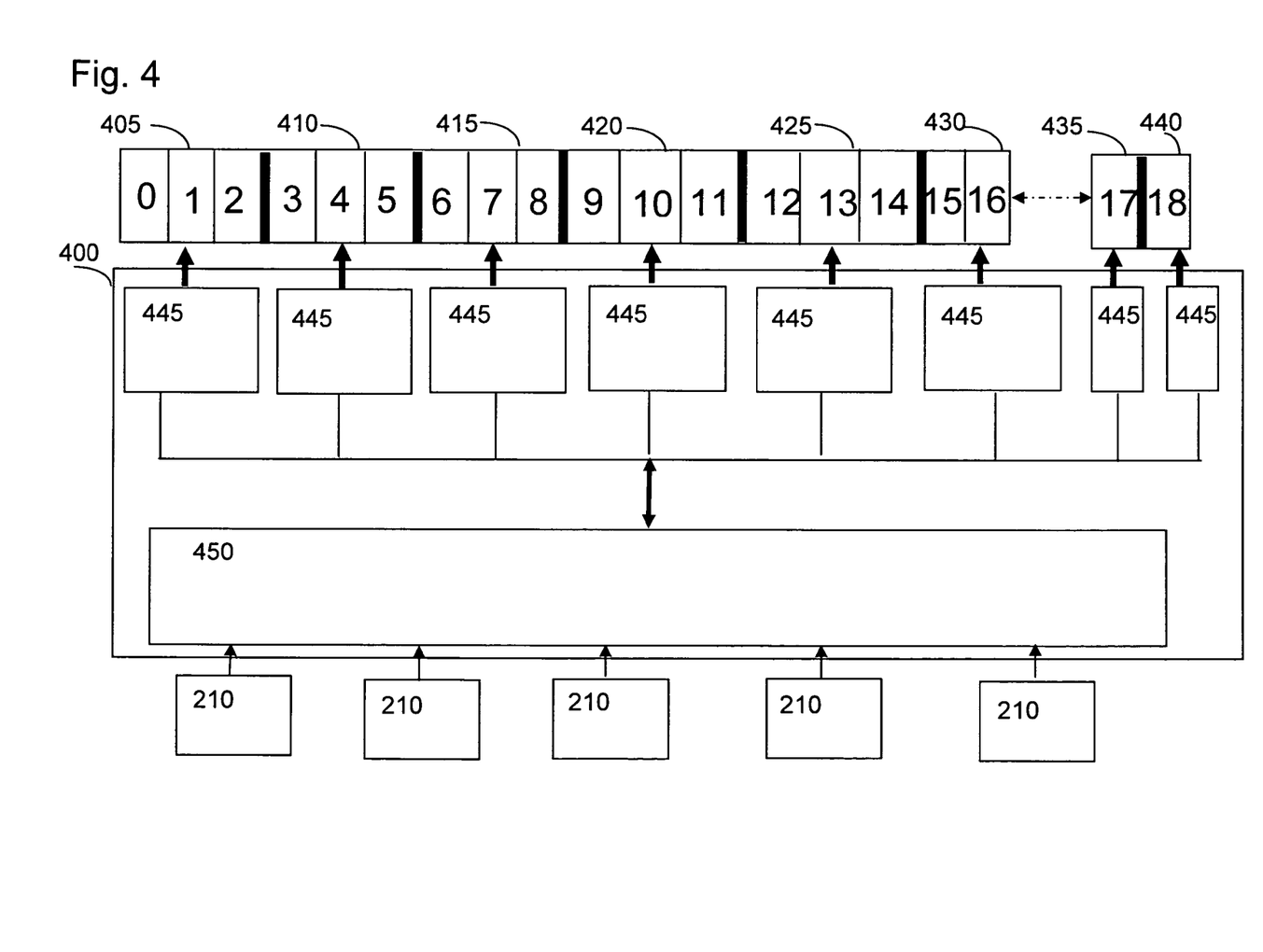
FIG. 4 is a block diagram showing an illustrative entitlement management system in accordance with an embodiment of the present invention.

Referring to FIG. 4, an illustrative embodiment of the present invention is shown in the form of an entitlement management system 400. The entitlement management system 400 is operable for residing in the firmware layer on a data processing system 100. The firmware layer is operable for interfacing with an operating system 210 such as AIX, LINUX i5/OS, or an IBM pSeries server, for example. The entitlement management system 400 may be part of the hypervisor application 110 or may be a standalone application configurable for communicating with the hypervisor application 110.

The entitlement management system 400 provides for the allocation of a number of micro-partitions to a virtual group 405, 410, 415, 420, 425, 430, 435, 440. For example, micro-partitions numbered 0 to 2 belonging to virtual group 405, micro-partitions 3 to 5 belonging to virtual group 410, micro-partitions 5 to 8 belonging to virtual group 415, micro-partitions 9 to 11 belonging to virtual group 420, micro-partitions 12 to 14 belonging to virtual group 425, micro-partitions 15 to 16 belonging to virtual group 430, and micro-partitions 30 and 32 belonging to virtual groups 435 and 440 (respectively) and so on. Any number of micro-partitions can be allocated to a virtual group 405, 410, 415, 420, 425, 430, 435, 440.

In an embodiment, a virtual group 405, 410, 415, 420, 425, 430, 435, 440 can be characterized as a deployment group, which in turn can be understood to be a group of micro-partitions which are assigned a designated function or task. For example, a first deployment group may be assigned the task of providing the processing resources for providing an HR service to a user or customer, a second deployment group may be assigned the task of providing the processing resources for a CRM solution, a third deployment group may be assigned the task of providing the processing resources for a web service, a fourth deployment group may be assigned the task of providing the processing resources for providing a financial service for a banking institution, and a fifth deployment group may be assigned the task of providing the processing resources to provides database discovery service.

A system administrator allocates the number or micro-partitions 200 to a deployment group 405, 410, 415, 420, 425, 430, 435, 440. The allocated number of micro-partitions is dependent on the application being deployed and the application's requirements of processing resources. For example, a business unit deploying a CRM solution on a virtualized IBM p5 server wherein the IBM p5 server is shared amongst several business-lines such as HR, finance, IT, etc., may require the use of nine micro-partitions with a processor entitlement of 4.64. The processor entitlement is shared amongst the nine micro-partitions. How the entitlement is shared is based on policies set by a system administrator. However, typically, each micro-partition is given a set number of processor cycles that it is allowed to consume—typically processor entitlements are defined in $1/100$ths of a CPU. Assuming that there are sufficient unallocated CPU cycles at boot time, these unallocated cycles become the allocated processor cycles and become the entitlement of each micro-partition. Each deployment group 405, 410, 415, 420, 425, 430, 435, 440 is also given an entitlement which is equal or greater than the sum of the entitlements of each of the micro-partitions. In addition each deployment group 405, 410, 415, 420, 425, 430, 435, 440 may be given a weighting—the weight setting is typically a number between 0 and 255 and often the default is 128. If a deployment group 405, 410, 415, 420, 425, 430, 435, 440 is allocated a weighting of 0, the deployment group 405, 410, 415, 420, 425, 430, 435, 440 is treated as a capped group and can not use any spare excess processing cycles. A deployments group's priority weighting is determined by its excess process cycles that it is consuming divided by its allocated weight. The lower the computed number the higher the priority the deployment group 405, 410, 415, 420, 425, 430, 435, 440 is given. Higher priority micro-partitions 200 can request a priority share of processor resources from lower priority micro-partitions. It will also be appreciated by a person skilled in the art that other forms of weighting mechanisms can be used, in order to determine which deployment groups 405, 410, 415, 420, 425, 430, 435, 440 spare processor cycles should be donated to, without departing from the scope of the invention.

A deployment group entitlement component 445 is provided which is responsible for the entitlement issues, processor cycle harvesting, and processor distribution for a designated deployment group. In practice, there may be a plurality of deployment group entitlement components 445 each responsible for their own designated deployment group. A deployment group entitlement component 445 manages its own group's entitlement issues, by determining whether its own capped or uncapped requirements have been met.

When a deployment group's 405, 410, 415, 420, 425, 430, 435, 440 own uncapped micro-partition 200 requirements have been met, within a dispatch window, and it has spare processor cycles that it will not use, it transmits this information to a management entitlement component 450 for distribution to other requester deployment groups 405, 410, 415, 420, 425, 430, 435, 440.

Figure 7:
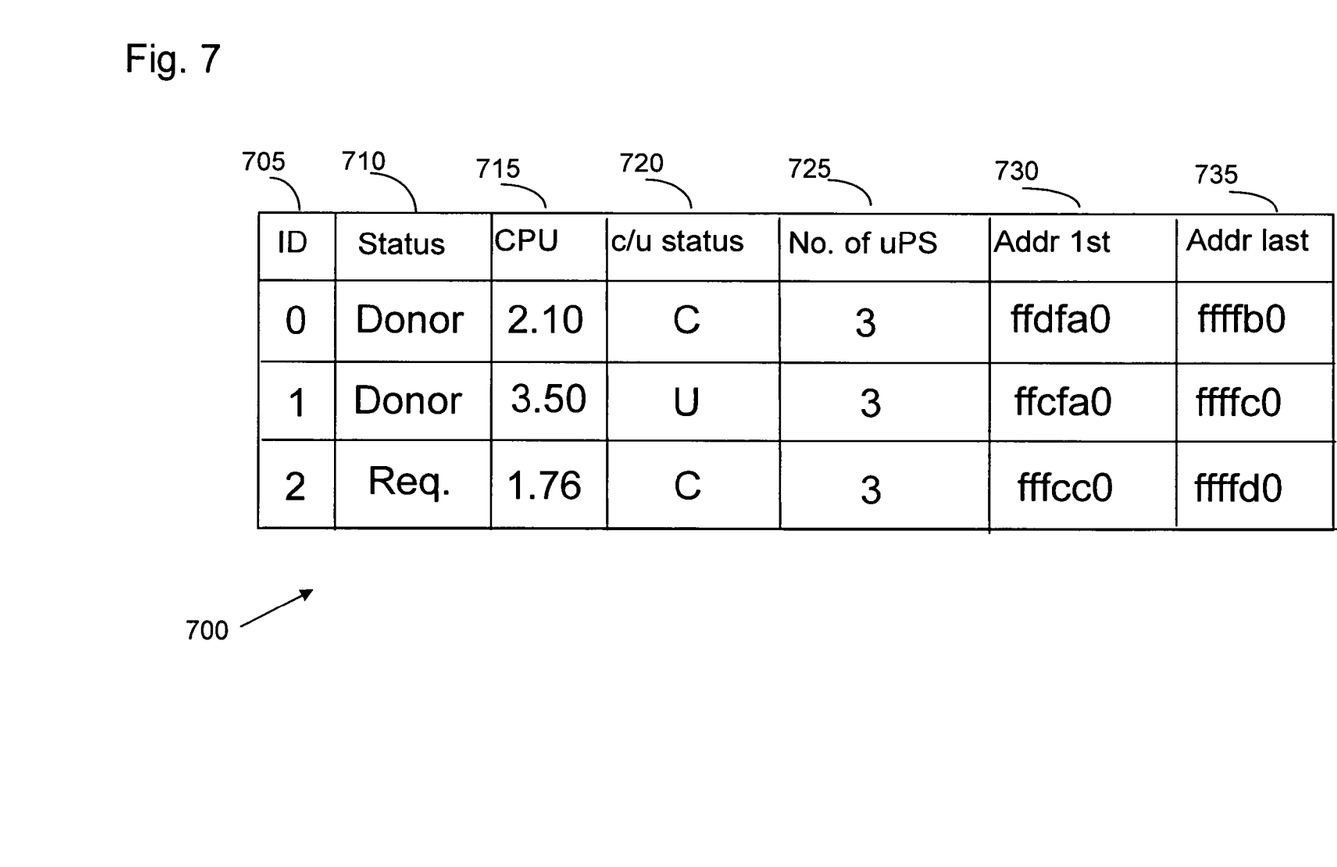
FIG. 7 is a table showing an illustrative partial status block table of an embodiment of the present invention.

Interfacing with each deployment group entitlement component 450, is a management entitlement component 450 which assumes overall responsibility for each of the deployment group entitlement components 445. The management entitlement component 450 provides a management level on top of each deployment group entitlement component 445. The management entitlement component 450 maintains a status of all deployment groups 405, 410, 415, 420, 425, 430, 435, 440 in a deployment group status block table 700 (FIG. 7). The status block table 700 defines the parameters under which each of the deployment groups 405, 410, 415, 420, 425, 430, 435, 440 will operate. The defined parameters drive the bounded behavior of the individual deployment group entitlement components 445. This is shown in FIG. 7 (and will be explained further with reference to FIG. 5).

Figure 5:
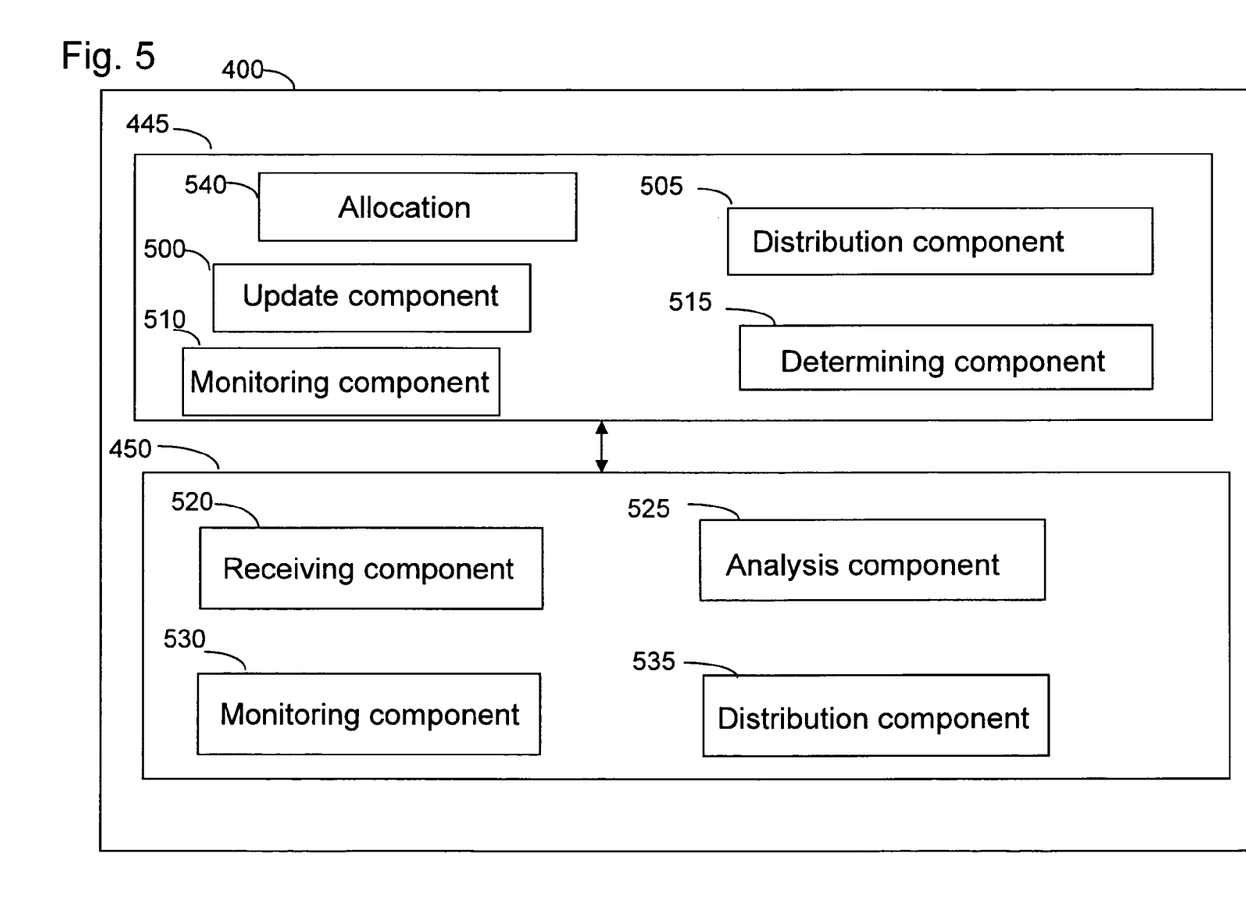
FIG. 5 is a block diagram showing the components of an illustrative entitlement management system in accordance with an embodiment of the present invention.

Referring now to FIG. 5 (and with reference to FIGS. 6 and 7) the components of the entitlement management system 400 are shown. As already discussed, the entitlement management system 400 comprises a plurality of deployment group entitlement components 445, each of which are dedicated to a group of micro-partition 405, 410, 415, 420, 425, 430, 435, 440. The deployment group entitlement components 445 comprise a number of components that interface and interact with each other is order to process, harvest and distribute spare processor cycles within its group. The components comprise an update table component 500, a monitoring component 510, a determining component 515, a distribution component 505, and an allocation component 540. Each of these components will be explained in turn.

An allocation component 540 allows a system administrator to allocate a number of micro-partitions to deployment group. Any number of micro-partitions can be allocated to a group.

Figure 6:
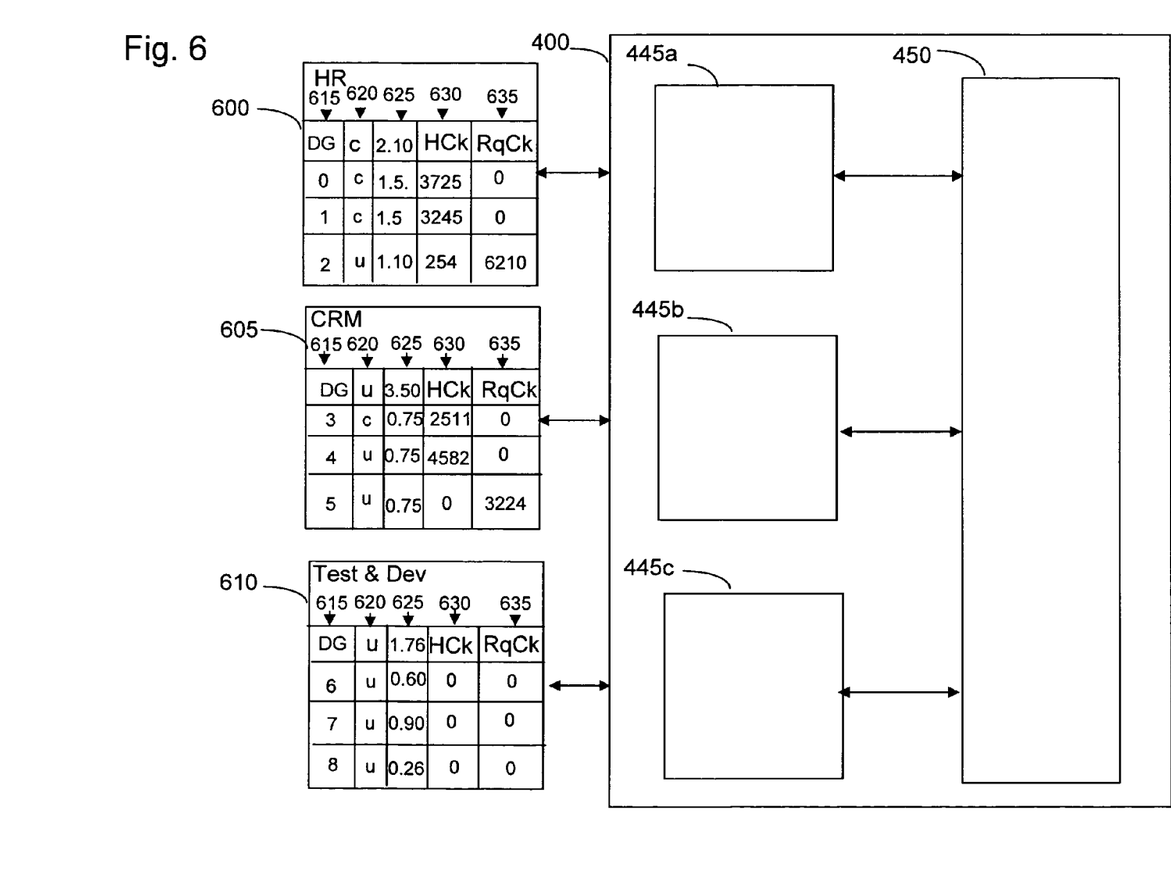
FIG. 6 is a block diagram showing of a number of illustrative deployment groups operable with the entitlement management system in accordance with an embodiment of the present invention.

The update table component 500 is responsible for updating and maintaining a status table for its own group of micro-partitions. Several status tables for a number of deployment groups are shown in FIG. 6, wherein each deployment group component 455*a*, 455*b* and 455*c* is responsible for its own deployment group status table 600, 605 and 610, respectively.

Each status table 600, 605, 610 comprises a column stating a numeric identifier 615 for each deployment group, a column stating whether the deployment group is capped or uncapped 620, a column stating the CPU entitlement 625 for each deployment group, a column stating the number of harvested processor cycles 630 of each deployment group, and a column stating the requested process cycles 635 for each uncapped deployment group. Other columns and rows comprise (not shown in diagram) totals for each of the columns specified above. Finally, a calculation is performed to determine the difference between the sum of the donated processor cycles and the sum of the requested processor cycles.

Moving back to FIG. 5, the determining component 515 determines which micro-partitions within in its own group require additional processor cycles or can donate spare processing cycles. As previously explained, each micro-partition is given the status of capped or uncapped. A capped micro-partition cannot exceed its processor cycle entitlement whereas an uncapped partition can. Using a weighting algorithm and taking into account the priority status of a micro-partition, the determining component 515 resolves processor cycles entitlement for each micro-partition and a distribution component 505 distributes the spare processor cycles to uncapped requester micro-partitions in its own group. If, after the distribution of spare processor cycles to each requester in the group, there are still spare processor cycles available, the determining component 515 informs the management entitlement component 450 of the available spare processing cycles for processing to other uncapped requester deployment groups.

The management entitlement component 450 comprises a number of components which interact and interface with each other in order to resolve processor cycle entitlement between each of the deployment groups 405, 410, 415, 420, 425, 430, 435, 440.

The management entitlement component 450 comprises a receiving component 520, an analysis component 525, a monitoring component 530 and a distribution component 535. The receiving component 520 receives the overall spare processor cycles from each of the deployment group components 445 or receives requests from deployment groups' components for requests for spare processor cycles. This information is written to the status block table 700.

Referring to FIG. 7, a status block table 700 is shown. The status block table 700 is similar to a deployment group table but holds information about each deployment group rather than information about each micro-partition in the deployment group.

The status block table 700 comprises an identifier column 705 displaying a unique identifier for each deployment group, a status column 710 indicating whether a deployment group is a donor or a requester, the CPU allocation column 715 for each deployment group, a number of micro-partitions column 720 in each of the deployment groups, the start of the first address of a deployment group column 725, and a last address of the deployment group column 730 (i.e., the address of where the deployment group ends). Further columns may comprise the entitlement capacity status in cycles and the weighting values 745 of each of the deployment groups. Based on all of the information, in the status block table 700, the entitlement management component 450 is able to resolve requests for spare processor cycles.

Referring again to FIG. 5, the monitoring component 530 monitors the status block table 700 over a predetermined time period within a dispatch window. As previously explained, each deployment group 405, 410, 415, 420, 425, 430, 435, 440 is given a CPU entitlement and is designated a donor or requester within a dispatch window. Further, each deployment group 405, 410, 415, 420, 425, 430, 435, 440 is designated as uncapped or capped. The uncapped deployment groups can use more processor cycles than their allocated entitlement whereas the capped deployment groups can only use up to their processing cycle entitlement. The monitoring component 530 constantly monitors the donor deployment groups to identify which donor deployment groups have spare processing cycle to donate to requester deployment groups.

The monitoring component 530 identifies a donor deployment group having spare processor cycles, within a dispatch window, the monitoring component parses the status block table 700 and identifies a requester deployment group that is requesting spare processor cycles. If there is more than one requester deployment group requesting spare processing cycles, an analysis component 525 identifies a requester deployment group that is uncapped and that is able to receive spare processor cycles. Once a suitable group has been located, the analysis component 525 determines the allocation of spare cycles amongst requester deployment groups according to a preferred allocation algorithm. For example, a deployment group 600 may be allocated a higher weight than deployment group 605. Thus the analysis component 525 will allocate a higher share of spare CPU processor resources to deployment group 600 and deployment group 605 will receive a lesser share of the spare processor resources and so on until all requests have been satisfied. A distribution component 535 distributes the spare processing cycles to the requester deployment groups.

Figure 8:
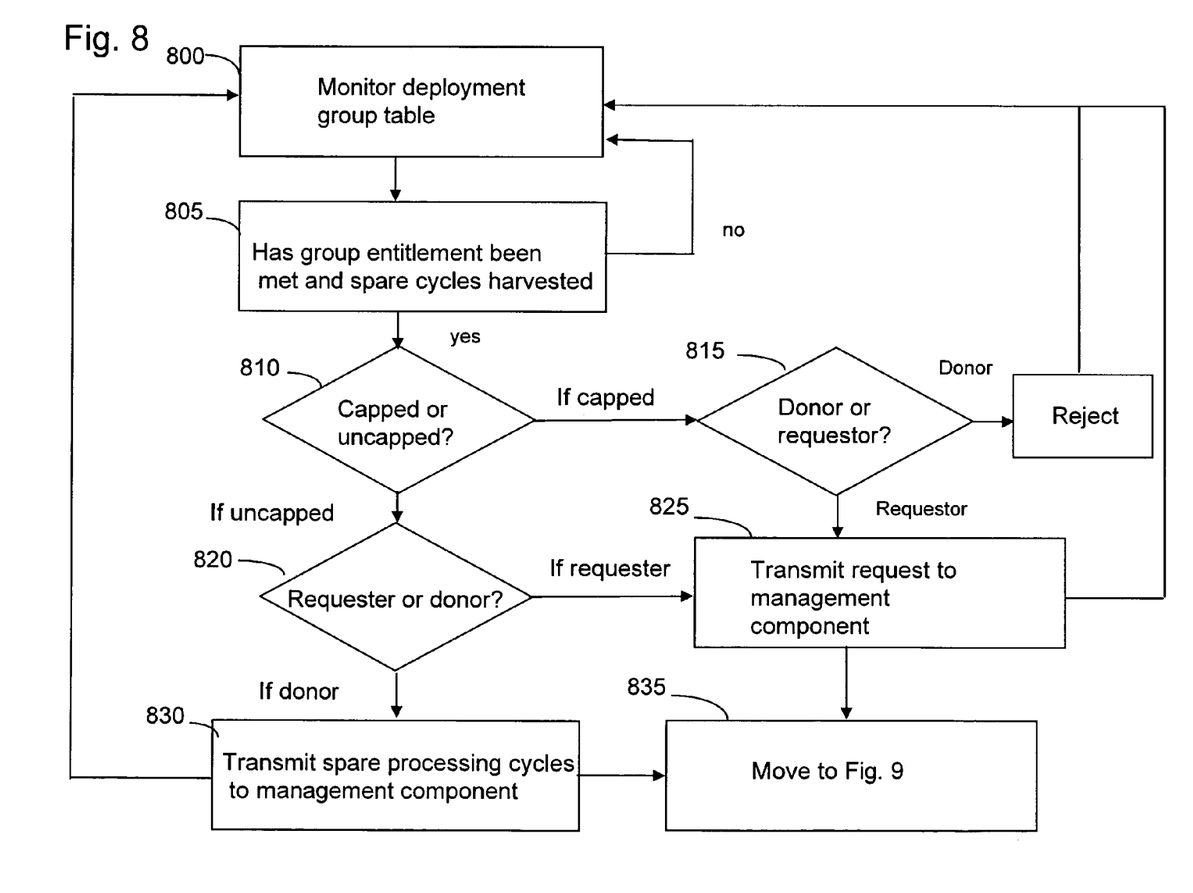
FIG. 8 is a flow chart detailing an illustrative process carried out by an entitlement management system in accordance with an embodiment of the invention.

Referring to FIG. 8, the process steps of the entitlement management system are shown.

At 800, the update component 500 continuously updates its own deployment group table 600, 605, 610 every predetermined number of milliseconds with the latest information on how many CPU processing cycles each micro-partition 200 in its group has consumed. The monitoring component 510 continually monitors the deployment group table 600, 605, 610 and notifies the determining component 515 when there is spare CPU processing cycles to be distributed among the micro-partitions in the deployment group. Each micro-partition is weighted and this signifies the micro-partitions priority status. The micro-partition with the highest priority will get its request satisfied first.

At 805 the determining component 515 co-operates with the monitoring component 510 and the distribution component 505 to resolve entitlement issues within its own deployment group by using the priority waiting described above and distributes spare CPU processor resources from donors to requesters. If entitlement issues have not been resolved, control moves back to 800 through to 805 until all entitlement issues are resolved within a designated dispatch window.

The determining component 515 detects that processor cycles are running low for some micro-partitions 200 and receives requests from requester micro-partitions for further processing cycles and donor micro-partition donating spare processor cycles. At 810, the determining component 515 determines from a received request whether a micro-partition is capped or uncapped. If the micro-partition is capped, control moves to 815 and the determining component 515 determines whether the micro-partition is a donor or a requester. If the determination is negative and the capped partition is a requester, the request is rejected and control moves back to 840. If the determination is positive and the micro-partition is a capped donor then the determining component 515, on determining that all entitlement requests with its group have been satisfied, transmits the donated spare processor cycles to the management component for distribution.

Moving back to 810, if the determining component 515 determines that the requesting micro-partition is an uncapped micro-partition, control moves to 820 and a further determination is made to determine whether the uncapped micro-partition is a requester or a donor. If the micro-partition is a donor, then the donor's spare processor cycles are transmitted to the management entitlement component 450 for processing at 830 and 840. Moving back to 820, if the micro-partition is an uncapped requester and its entitlement has been met within this dispatch window and it required further processing cycles, control moves to 825 for processing.

Figure 9:
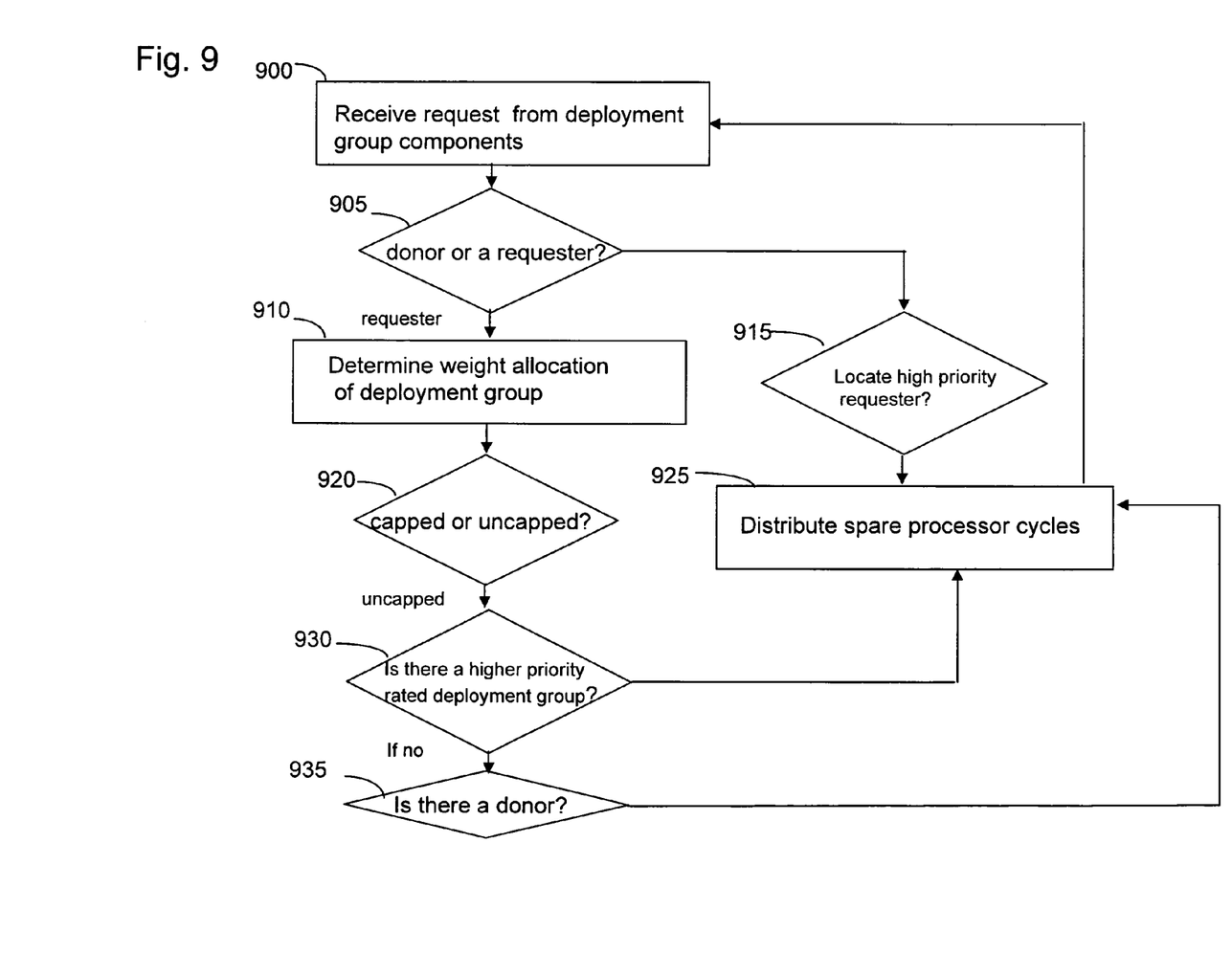
FIG. 9 is a follow-on flow chart detailing the process carried out by the entitlement management system of FIG. 8.

Moving on to FIG. 9, at 900 the receiving component 520 receives from each of the deployment group's entitlement components requests for spare CPU processor cycles or requests donating further processor cycles. The monitoring component 530 writes this information to a status block table 700 and continues to monitor the status block table 700 for updates. The monitoring component 530 cooperates with an analysis component 525 in order to analyze the requests from deployment group entitlement components and the data written to the status block table.

At 905, the analysis component 525 determines whether the deployment group is a requester or a donor. If the deployment group is a requester, control moves to 910 and the priority rating of the deployment group is determined. Next, at 920, a further determination is made as to whether the deployment group is a capped or uncapped deployment group. If the deployment group is uncapped, control moves to 930 and the analysis component determines whether there is a deployment group with a weighting that indicates that it should receive a higher share of CPU processor resources than that of another requesting deployment group. If a negative determination is made, a higher share of spare processor resources are distributed to the requesting uncapped deployment group having the higher weighting at 925.

Moving back to 905, if the deployment group is determined to be a donor, control moves to 915 and the analysis component locates a high priority deployment group that has requested spare processor cycles and control moves to 925, where the processor cycles are distributed to deployment group. This process of matching donors to requesters continues for each deployment group in a dispatch window.

Although the present invention has been described with reference to a two-tiered entitlement system it will be apparent to a person skilled in the art that a three-tiered, four-tiered, etc., entitlement system could be deployed where each deployment group is categorized into super groups and thus each super group comprises a further management layer.

The foregoing description of the preferred embodiments of this invention has been presented for purposes of illustration and description. It is not intended to be exhaustive or to limit the invention to the precise form disclosed, and obviously, many modifications and variations are possible.

The invention claimed is:

1. An entitlement management system for distributing unallocated CPU processor resources to a plurality of deployment groups operating in a data processing system, the system comprising:
a computer hardware device, including:
a deployment group entitlement component comprising:
an allocation component for allocating a set of micro-partitions from a plurality of micro-partitions to each deployment group of the plurality of deployment groups, wherein each deployment group is assigned at least one designated function of a plurality of designate functions, wherein each designated function serving a different function than the other designated functions, wherein each micro-partition has an micro-partition entitlement of unallocated CPU processor cycles, and wherein each deployment group has a deployment group entitlement equal to or greater than a sum of the micro-partition entitlements of the set of micro-partitions;
a determining component for identifying unallocated CPU processor cycles from a donor micro-partition and distributing the identified unallocated CPU processor cycles to a requester micro-partition in the deployment group, the determining component further identifying when there are no further unallocated CPU processor cycles to be donated to any of the micro-partitions in the deployment group and communicating a request to a management entitlement component; and
a management entitlement component for receiving requests from at least two deployment group entitlement components and identifying one of the plurality of deployment groups having unallocated CPU processor cycles to donate to deployment group and donating the unallocated CPU cycles to the another deployment group.

2. The system of claim 1, wherein the management entitlement component further comprises:
an analysis component for determining an allocation weighting of at least one deployment group.

3. The system of claim 2, wherein the analysis component further determines the deployment group among the plurality of deployment groups having a highest allocation weighting in order to allocate a proportion of identified unallocated CPU processor cycles to the deployment group having the highest allocation weighting.

4. The system of claim 1, wherein the analysis component further determines whether at least one deployment group is a capped deployment group or an uncapped deployment group.

5. The system of claim 1, wherein the analysis component further determines if at least one deployment group is a donator of CPU processor cycles or a requester of unallocated CPU processor cycles.

6. The system of claim 5, wherein the analysis component further determines if the deployment group requesting unallocated processor cycles is an uncapped deployment group and therefore able to receive unallocated processor cycles.

7. The system of claim 6, wherein the analysis component further determines if the requesting deployment group is a capped deployment group, and on a positive determination rejecting the requesting deployment group's request.

8. The system of claim 1, wherein at least one deployment group is associated with an application level processing function.

9. An entitlement management method for distributing unallocated CPU processor resources to a plurality of deployment groups operating in a data processing system, comprising:
allocating, using a computer device, a set of micro-partitions from a plurality of micro-partitions to each deployment group of the plurality of deployment groups, wherein each deployment group is assigned at least one designated function of a plurality of designate functions, wherein each designated function serving a different function than the other designated functions, wherein each micro-partition has an micro-partition entitlement of unallocated CPU processor cycles, and wherein each deployment group has a deployment group entitlement equal to or greater than a sum of the micro-partition entitlements of the set of micro-partitions;
identifying, using the computer device, unallocated CPU processor cycles from a donor micro-partition and distributing the identified unallocated CPU processor cycles to a requester micro-partition in the deployment group;
identifying, using the computer device, when there are no further unallocated CPU processor cycles to be donated to any of the micro-partitions in the deployment group; and
identifying, using the computer device, one of the plurality of deployment groups having unallocated CPU processor cycles to donate to another deployment group and donating the unallocated CPU cycles to the another deployment group.

10. The method of claim 9, further comprising:
determining an allocation weighting of at least one deployment group.

11. The method of claim 10, further comprising:
identifying the deployment group among the plurality of deployment groups having a highest allocation weighting in order to allocate a proportion of identified unallocated CPU processor cycles to the deployment group having the highest allocation weighting.

12. The method of claim 9, further comprising:
determining whether at least one deployment group is a capped deployment group or an uncapped deployment group.

13. The method of claim 9, further comprising:
determining if at least one deployment group is a donator of CPU processor cycles or a requester of unallocated CPU processor cycles.

14. The method of claim 13, further comprising:
determining if at least one deployment group requesting unallocated processor cycles is an uncapped deployment group and therefore able to receive unallocated processor cycles.

15. The method of claim 14, further comprising:
determining if the requesting deployment group is a capped deployment group, and on a positive determination, rejecting the requesting deployment group's request.

16. The method of claim 9, wherein at least one deployment group is associated with an application level processing function.

17. A method for deploying an application for distributing unallocated CPU processor resources to a plurality of deployment groups operating in a data processing system, comprising:
  providing a computer infrastructure being operable to:
    allocate a set of micro-partitions from a plurality of micro-partitions to each deployment group of the plurality of deployment groups, wherein each deployment group is assigned at least one designated function of a plurality of designate functions, wherein each designated function serving a different function than the other designated functions, wherein each micro-partition has an micro-partition entitlement of unallocated CPU processor cycles, and wherein each deployment group has a deployment group entitlement equal to or greater than a sum of the micro-partition entitlements of the set of micro-partitions;
    identify unallocated CPU processor cycles from a donor micro-partition and distributing the identified unallocated CPU processor cycles to a requester micro-partition in the deployment group;
    identify when there are no further unallocated CPU processor cycles to be donated to any of the micro-partitions in the deployment group; and
    identify one of the plurality of deployment groups having unallocated CPU processor cycles to donate to another deployment group and donating the unallocated CPU cycles to the another deployment group.

18. A program product stored on a non-transitory computer readable medium, which when executed, distributes unallocated CPU processor resources to a plurality of deployment groups operating in a data processing system, the non-transitory computer readable medium comprising program code for:
  allocating a set of micro-partitions from a plurality of micro-partitions to each deployment group of the plurality of deployment groups, wherein each deployment group is assigned at least one designated function of a plurality of designate functions, wherein each designated function serving a different function than the other designated functions, wherein each micro-partition has an micro-partition entitlement of unallocated CPU processor cycles, and wherein each deployment group has a deployment group entitlement equal to or greater than a sum of the micro-partition entitlements of the set of micro-partitions;
  identifying unallocated CPU processor cycles from a donor micro-partition and distributing the identified unallocated CPU processor cycles to a requester micro-partition in the deployment group;
  identifying when there are no further unallocated CPU processor cycles to be donated to any of the micro-partitions in the deployment group; and
  identifying one of the plurality of deployment groups having unallocated CPU processor cycles to donate to another deployment group and donating the unallocated CPU cycles to the another deployment group.

* * * * *